United States Patent [19]

Thomas

[11] Patent Number: 4,506,748

[45] Date of Patent: Mar. 26, 1985

[54] BATTERY SHOCK ELIMINATOR

[76] Inventor: David A. Thomas, 1915 Nugget Dr., Clearwater, Fla. 33515

[21] Appl. No.: 497,183

[22] Filed: May 23, 1983

[51] Int. Cl.³ .................. B62D 25/00; B60R 18/02
[52] U.S. Cl. ................................. 180/68.5; 248/503; 248/636
[58] Field of Search ............... 180/68.5; 248/562, 638, 248/503, 636, 567, 295.1, 201; 104/34; 105/50; 181/207, 208, 209

[56] References Cited

U.S. PATENT DOCUMENTS

| 602,302 | 4/1898 | Brougham et al. | 180/65.1 |
| 929,118 | 7/1909 | Buckwalter | 180/68.5 |
| 1,459,973 | 6/1923 | Colgan | 180/68.5 |
| 1,591,940 | 7/1926 | Joyce | 180/68.5 |
| 2,035,066 | 3/1936 | Havas | 180/68.5 |

FOREIGN PATENT DOCUMENTS 824443 12/1951 Fed. Rep. of Germany ..... 180/68.5

Primary Examiner—David M. Mitchell
Assistant Examiner—Mark Dukes
Attorney, Agent, or Firm—Ronald E. Smith

[57] ABSTRACT

An assembly that mounts a wet cell type battery member on a vehicle frame such that jarring of the frame does not transmit substantial damage-causing shock to the battery. A first part of the assembly is fixedly secured to the vehicle frame, but a second part of the assembly is movably mounted relative to the first part. The second, movably mounted, part supports the battery, and the first and second parts are interconnected by a shock attenuating means so that force imparted to the first part by a jarring of the vehicle frame is transmitted in attenuated amounts to the battery.

9 Claims, 2 Drawing Figures

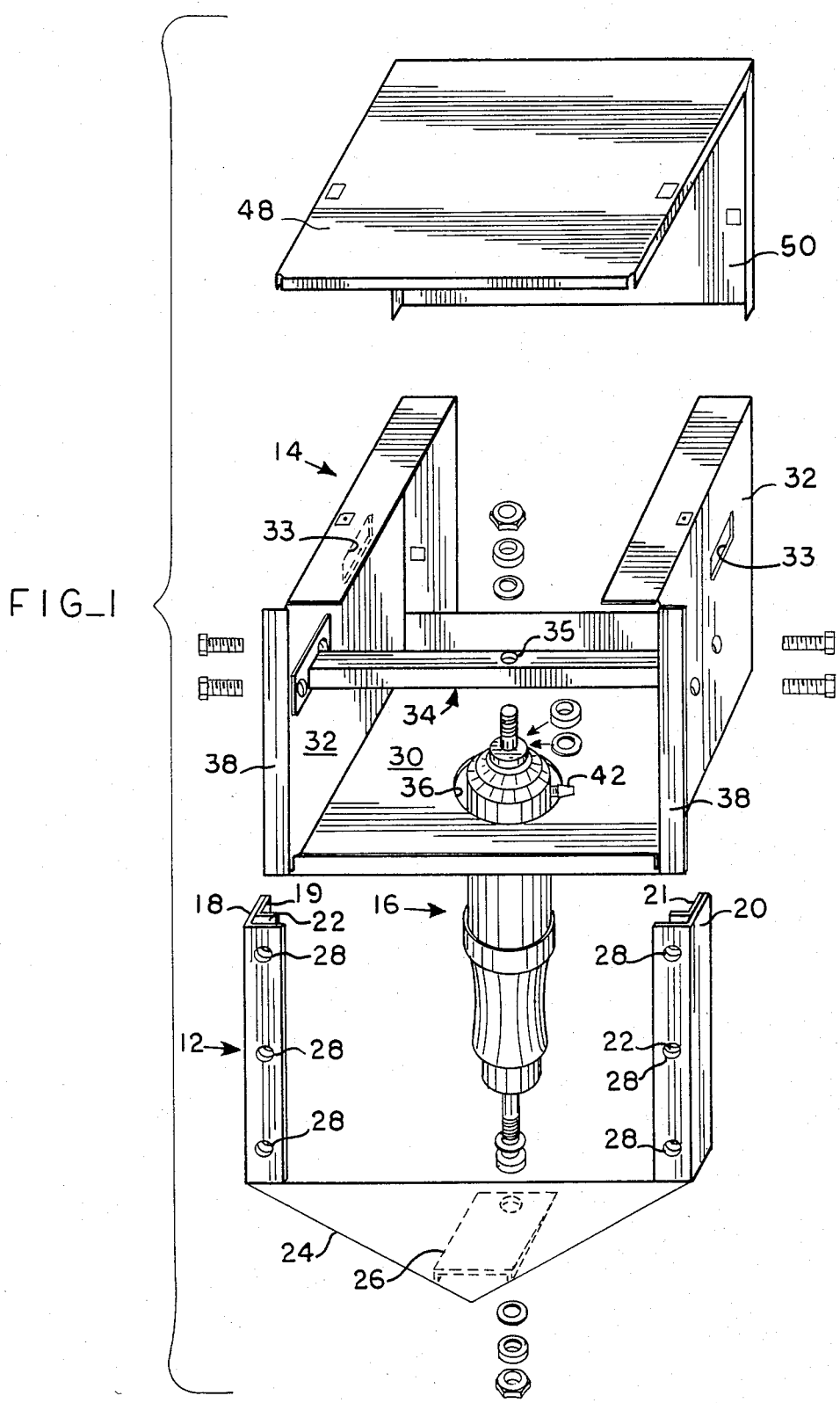

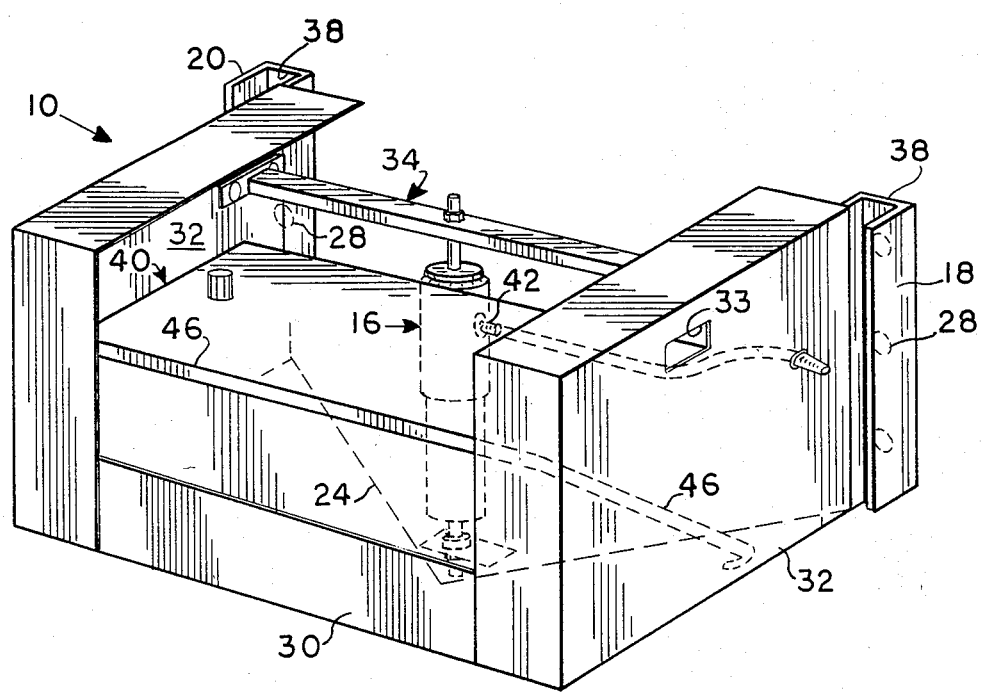
FIG_2

BATTERY SHOCK ELIMINATOR

BACKGROUND OF THE INVENTION

1. Field of the Invention

This invention relates, generally, to assemblies of the type designed to protect wet cell type batteries against jar-induced damage, and more specifically relates to such an assembly having a battery supporting member that is interconnected to the frame of the vehicle by a shock attenuating means.

2. Description of the Prior Art

A search of U.S. patents that was conducted prior to the filing of this disclosure located the following patents in the general field of this invention:

| Patentee | U.S. Pat. No. | Date of Issue |
| --- | --- | --- |
| Bailey | 972,213 | 11/26/07 |
| Buckwalter | 929,118 | 07/27/09 |
| Colgan | 1,489,973 | 06/26/23 |
| Wills | 2,551,990 | 05/08/51 |
| Wilson | 2,947,373 | 08/02/60 |
| Lantis | 3,061,331 | 10/30/62 |
| Holka | 3,165,163 | 01/12/65 |

The search results are merely a representative sampling of the art in this field, but they do represent the most relative prior art.

The battery mounting assemblies that are known sometimes incorporate shock attenuating means into the battery housing, but in the known devices, the entire battery housing is mounted on a vehicle frame so that the shock attenuating means provided do not properly insulate the battery from the shocks to which the vehicle frame is often subjected.

SUMMARY OF THE INVENTION

The longstanding but heretofore unfulfilled need for a battery housing that protects the battery from shocks applied to the vehicle frame on which the battery is mounted is now fulfilled in the form of an assembly that includes a first part fixedly secured to the vehicle frame, and a second part that is movably mounted relative to said first part and interconnected thereto by a shock attenuating means.

A base member is formed by a pair of laterally spaced, upstanding, channel-defining members that are interconnected at their lowermost ends by a vertically aligned plate member. A platform is fixedly secured to the plate member, in cantilever relation thereto, and is provided with means to fixedly secure the lowermost end of a shock absorbing means thereto.

A battery housing member has a bottom wall upon which a battery is supported, and includes upstanding, laterally spaced sidewalls, a back wall and a top wall to complete the enclosure. The housing member has no forward wall, per se, but a preselected wall of the vehicle to which the base member is secured provides the enclosure means for the forward portion of the housing. Flange members are formed at the respective forward edges of the sidewall members, (said "forward" edges being the sidewall edges nearest said preselected vehicle wall) and such flange members are slidingly disposed within the channel defining members of the aforementioned base member. In this manner, the battery-carrying housing member is relatively movable with respect to the base member.

A shock absorbing means interconnects the housing member and the base member so that when the vehicle and hence the base member fixedly secured thereto are jarred, the full force of the jarring will not be transmitted to the battery-containing housing due to the shock absorbing means that interconnects such base member and such housing.

It is therefore seen to be the primary object of this invention to provide a battery mounting for wet cell batteries that protects the same against damage of the type caused by externally imparted forces impinging against a battery housing.

A closely related object is to provide the needed assembly in a simple and economical form that includes a minimum of parts.

Another object is to provide a versatile assembly of the type needed so that differing types of shock absorber means may be employed.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is an exploded perspective view of an embodiment illustrative of the invention. In FIG. 1, the forward or frontal portion of the invention is disposed toward the viewer.

FIG. 2 is an isometric view showing the parts of FIG. 1 in their assembled configuration. In FIG. 2, the rearward portion of the invention is disposed toward the viewer.

Similar reference numerals refer to similar parts throughout the several views of the drawings.

DETAILED DESCRIPTION OF THE PREFERRED EMBODIMENT

Referring now to FIGS. 1 and 2, it will there be seen that the preferred embodiment of the invention is generally designated by the reference numeral 10 as a whole.

The novel base member is indicated generally as 12, the housing is indicated as 14 and a shock absorbing means of the air type is indicated as 16.

The base member 12 includes a pair of upstanding, nested angle iron members 18, 19 and 20, 21. The angle iron members are fixedly secured to one another as shown to define a narrow, elongate channel means 22 between the respective spaced portions thereof. Thus, it should be understood that the angle iron members are employed merely to define the desired channel, and such channel may be defined by any suitable means, and this invention accordingly is not restricted to the use of angle iron members.

The lowermost ends of the angle iron members are interconnected by a rigid plate member 24 that is preferably of triangular configuration as shown, but which may be of any predetermined geometrical configuration. The plate member 24 lies in a vertical plane and may abut the frame portion of a vehicle to which the base member 12 is fixedly secured. A platform member 26, shown in phantom lines, is fixedly secured in orthogonal relation to the plate member 24 and is apertured as shown to receive the lowermost end of the shock absorber means 16. A plurality of preferably equidistantly spaced aperture means 28 are also formed in the channel defining members to facilitate attachment of said base member 12 to the vehicle frame.

The housing member 14 includes a bottom wall 30 and a pair of parallel, laterally spaced upstanding sidewalls 32 that are interconnected by an elongate rigid beam member 34, in the manner depicted. The beam member is apertured as indicated in phantom lines by the numeral 35 to receive the uppermost end of the shock absorber means 16, and the bottom wall 30 is also provided with an opening 36 to admit the shock absorber means into the battery housing.

Each sidewall 32 has an outwardly turned flange 38 at its forward edge, which flange members are slidingly received within the aforementioned channels 32 defined by angle iron members 18, 19 and 20, 21. Thus, the housing member 14 is slidable in a vertical plane relative to the base member 12 as the respective flange members 38 move up and down within the channels 22. It should be clear that the shock absorber means 16 will attenuate shocks applied to the base member 12 because one end of the shock absorbing means is fixedly secured to such base member whereas the uppermost end of said shock absorber means is fixedly secured to the housing member 14 through said beam member 34.

It is a common practice for tractor trailer drivers to simply allow their trailers to drop a distance of several feet when uncoupling the tractor and the trailer. The trailer, which is very heavy, impacts the ground or other support surface with a very strong impact. Conventionally mounted batteries can be destroyed by the force of one of such impacts, and almost all batteries will eventually be destroyed by the cumulative effect of successive impacts. In the inventive construction, however, only the base member 12 will receive the full force and effect of such a jarring force. The lower portion of the shock absorbing means 16 will transmit this force to the upper portion of the shock absorbing means is greatly attenuated amplitude. Thus, the force appearing at the elongate rigid beam 34 is of small amplitude vis a vis the force appearing on the base member 12. Since the battery 40 (FIG. 2) is supported by the housing 14, the force appearing at the battery will be the attenuated force, and not the original force.

Although any shock absorbing means, including springs, for example, can be employed, it is preferable to employ an air type shock absorber means. Air can be admitted into or withdrawn from such a shock absorber means through the nozzle member 42 and air hose member 44, as shown in FIG. 2.

The battery is preferably maintained within the housing through conventional tiedown means 46 shown in FIG. 2, and the sidewalls 32 are apertured as at 33 to admit the battery cables and the air hose.

The housing may be further enclosed by the provision of a top wall 48 and a rear wall 50 (FIG. 1).

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, that which is claimed is:

1. An assembly for mounting a wet cell battery, said assembly of the type designed to attenuate the amplitude of externally imparted forces impinging upon said battery, comprising,
   a vehicle having a frame portion,
   a base member of predetermined dimension and configuration,
   said base member being fixedly secured to said frame of said vehicle and movable therewith,
   a housing member for housing said battery,
   means for slideably interconnecting said base member and said housing member so that said members are movable relative to one another in a vertical plane and so that said housing member is not mounted on said frame portion of said vehicle,
   a shock attenuating means disposed in interconnecting relation to said base and housing members so that forces impinging against said frame portion of said vehicle are attenuated attendant relative movement of said base and housing members and the dampening action of said attenuating means,
   said means for slideably interconnecting said base member and said housing member including a pair of laterally spaced, upstanding channel-defining members,
   a vertically disposed plate member interconnecting the respective lowermost ends of said channel-defining members,
   a horizontally disposed platform means fixedly secured to said plate member in cantilever relation thereto,
   and said platform means adapted to securely engage a lower end of said shock attenuating means so that said lower end of said attenuating means is displaced attendant displacement of said frame portion of said vehicle.

2. The assembly of claim 1, wherein said housing member further comprises,
   a horizontally disposed bottom wall member adapted to support a battery member disposed thereatop,
   a pair of upstanding, laterally spaced sidewall members mounted at the laterally spaced opposite ends of said battery-supporting bottom wall member,
   a flange member formed at the respective forward edges of said sidewall members,
   said flange members respectively slidably disposed within the respective channels defined by said channel-defining members.

3. The assembly of claim 2, wherein said bottom wall member is apertured adjacent its forward portion to admit the upper end of said shock attenuating means into the housing member collectively defined by said bottom and sidewall members.

4. The assembly of claim 3, wherein an elongate, rigid beam member is disposed in interconnecting, orthogonal relation to said laterally spaced sidewall members, wherein said beam member is disposed substantially parallel to and upwardly of said bottom wall member, and wherein the uppermost end of said shock attenuating means is fixedly secured to said beam member, substantially mid-length thereof so that said shock attenuating member, having its opposite ends fixedly secured to different ones of said base and housing members, interconnects the same in a shock-attenuating coupling.

5. The assembly of claim 4, wherein said housing member further includes a top wall member and a rear wall member to further enclose the battery supported by the bottom wall of said housing member.

6. The assembly of claim 5, wherein said sidewall members are apertured to admit battery cable means into said housing member.

7. The assembly of claim 6, wherein battery tiedown means are provided to secure said battery to the bottom wall of said housing member.

8. The assembly of claim 7, wherein said shock attenuating means is a shock absorber member.

9. The assembly of claim 7, wherein said shock attenuating means is an air-type shock absorber member.

* * * * *